United States Patent [19]

Scatá et al.

[11] Patent Number: 4,464,478

[45] Date of Patent: Aug. 7, 1984

[54] CATALYST COMPONENTS AND CATALYSTS FOR POLYMERIZING OLEFINS

[75] Inventors: Umberto Scatá, Ferrara; Enrico Albizzati, Arona; Enzo Giannetti, Novara, all of Italy

[73] Assignee: Montedison S.p.A., Milan, Italy

[21] Appl. No.: 428,976

[22] Filed: Sep. 30, 1982

Related U.S. Application Data

[63] Continuation of Ser. No. 238,647, Feb. 26, 1981, abandoned, which is a continuation of Ser. No. 87,395, Oct. 22, 1979, abandoned.

[30] Foreign Application Priority Data

Oct. 23, 1978 [IT] Italy .............................. 28994 A/78

[51] Int. Cl.³ .............................................. C08F 4/64
[52] U.S. Cl. ..................................... 502/111; 502/104; 502/122; 502/125; 502/126; 502/127; 526/125
[58] Field of Search ................... 252/429 B, 431 R; 502/111, 104, 122, 125, 126, 127

[56] References Cited

U.S. PATENT DOCUMENTS

| | | | |
|---|---|---|---|
| 4,076,924 | 2/1978 | Toyota et al. | 252/429 B X |
| 4,115,319 | 9/1978 | Scata et al. | 252/429 B |
| 4,143,223 | 3/1979 | Toyota et al. | 252/429 B X |
| 4,189,553 | 2/1980 | Birkelbach | 252/429 B X |

*Primary Examiner*—Patrick Garvin

[57] ABSTRACT

Catalyst-forming components are prepared from
  (a) a halogenated Ti compound containing at least a Ti-halogen bond;
  (b) an electron-donor compound free of active hydrogen atoms;

and
  (c) the solid product of the reaction between at least one electron-donor compound containing active hydrogen atoms and a Mg dihalide or a complex thereof with an electron-donor compound free of active hydrogen atoms, obtained by decomposing organic Mg compounds containing at least one Mg-R or Mg-OR group, in which R is an alkyl, aryl, cycloalkyl or alkenyl radical having 1 to 20 carbon atoms, by means of a halogenating agent different from (a).

Catalysts for polymerizing olefins and prepared by mixing the aforesaid catalyst-forming components with an organometallic compound of Al are also disclosed.

5 Claims, No Drawings

CATALYST COMPONENTS AND CATALYSTS FOR POLYMERIZING OLEFINS

This is a continuation of application Ser. No. 238,647 filed Feb. 26, 1981 and now abandoned which in turn is a continuation of Ser. No. 87,395 filed Oct. 22, 1979 and now abandoned.

THE PRIOR ART

Our group has disclosed catalysts useful in the polymerization of alpha-olefins and prepared by reacting a Ti compound and an electron-donor compound with a carrier based on Mg dihalide obtained by reaction of an organometallic Mg compound containing OR groups bound to the Mg atom, with a halogenating agent other than the halogenated Ti compounds, and capable of converting, at least partially, the organometallic Mg compound into a dihalide.

Said catalysts give very high polymer yields with respect to the Ti compound contained in the catalyst. In some cases, however, such yields are not satisfactory if referred to the halide which is present in the halogenated compounds constituting the catalyst, since too high contents of halogenated compounds in the polymer are not desirable as they bring about corrosion phenomena in the apparatuses utilized for processing the polymer.

THE PRESENT INVENTION

One object of this invention is to provide new catalyst-forming components comprising a carrier based on Mg dihalide and which have improved characteristics as compared with the aforesaid previously disclosed catalyst-forming components.

Another object is to provide catalysts prepared from the new components and which polymerize olefins to high yields of polymers having a reduced content of halogenated compounds liable to corrode the apparatuses used in processing the polymers.

These and other objects are achieved by this invention which provides catalysts one component of which is a solid product prepared by reacting:

(a) a halogenated Ti compound containing at least a Ti-halogen bond;

(b) an electron-donor compound which does not contain active hydrogen atoms (ED), reacted as such or as a complex with an electron-acceptor compound (or Lewis acid) or with product (c) infra;

and (c) the solid product of the reaction between at least one electron-donor compound which does contain active hydrogen atoms (HED) and a Mg dihalide, or a complex of said Mg dihalide with a compound (ED), obtained by decomposition, with halogenating agents different from the Ti compounds (a), of an organic Mg compound containing Mg bonded to at least one of —R and —OR, R being an alkyl, aryl, cycloalkyl or alkenyl radical of from 1 to 20 carbon atoms.

In said Mg compound, the remaining valence of the Mg is satisfied by a halogen, a radical R or OR as defined, or by COX' in which X' is halogen.

The compound (HED) used in practicing this invention is selected from the aliphatic, cycloaliphatic or aromatic alcohols or thioalcohols having 1 to 20 C, the phenols having 6 to 20 C and the silanols containing 1 to 20 C, and is employed in such amounts as to result in an adduct, with the Mg dihalide, containing from 0.1 to 6.0 moles of (HED) per mole of the dihalide.

The complex between Mg dihalide and (ED) employed in (c) contains up to 6 moles of (ED) compound per mole of Mg dihalide, and the (ED) compound preferably contains one or more electronegative groups containing oxygen atoms. For example, the (ED) compound is an alkyl ether, such as, for instance, ethyl ether, n-butyl ether, isoamyl ether.

As a consequence of the reaction illustrated hereinabove, at least on the surface of the catalyst component there is the formation of reaction products between at least one Mg dihalide, a Ti compound and an (ED) compound, in which the ratio between moles of (ED) and gram atoms of Ti ranges from 0.2 to 4.

The compounds, other than the Mg dihalides, used for preparing the present catalyst components have the general formula:

wherein R has the meaning as defined above and X is a halogen, in particular chlorine, bromine or iodine, R, OR or COX', wherein R has the meaning as defined above and X' is a halogen; m is $0 < m \leq 2$; n is $0 \leq n < 2$; and $m + n = 2$.

Presently preferred compounds of formula $R_mMgX_n$ are the Mg-monoalkyls and Mg-phenyls, the Mg-mono and -dialcoholates and the Mg-dialkyls, specific examples of which include: n-butyl-magnesium-chloride, phenylmagnesium-chloride, n-butylmagnesium-butoxy, n-propyl-magnesium-propoxy, sec.-butylmagnesium-chloride, magnesium diethyl, benzyl-magnesium-chloride $Mg(OC_2H_5)_2$, $ClMgOC_2H_5$, $ClMgOC_6H_5$ and $ClMgOSi(C_6H_5)_3$.

Said Mg compounds can be utilized as such or in the form of complexes with ethers or amines, (examples of which complexes are described in British Pat. No. 1,343,781), or with organometallic compounds of elements such as Al, Zn, B, Si, or with metal alcoholates such as Ti- and Zr-tetraalcoholates and Al-alcoholates. Such compounds are reacted preferably, in the form of solutions in hydrocarbons or of complexes thereof which are hydrocarbon-soluble.

Among the soluble complexes, those having the formula:

wherein n is preferably comprised between 0.15 and 2.5 and R is a hydrocarbon radical having 1 to 20 C, in particular an alkyl radical having 2 to 12 C, are of particular interest due to the possibility of obtaining catalyst components having a narrow particle distribution by the use thereof.

Such complexes are generally prepared by reacting, according to conventional methods, metal Mg with an organic halide employed in a stoichiometric amount, and successively with the $AlR_3$ compound.

The methods of preparing the $R_mMgX_n$ compounds are well known in the literature (see, for example. Chem. Ind. (1960) 1533; Tetrahedron Letters (1962) 621).

The processes by which the organometallic Mg-compounds $R_mMgX_n$ are converted to Mg-dihalide are known in the literature. They consist in reacting the $R_mMgX_n$ compound with a halogenating agent capable of introducing Mg-halogen bonds into the organometallic Mg compound. Examples of the useful halogenating agents are: $SiCl_4$, halosilanes such as $ClSi(CH_3)_3$, $Cl_3SiCH_3$, $SOCl_2$, Al-alkyl halides such as $Al(C_2H_5)_2Cl$, $Al(C_2H_5)Cl$, halides such as $AlCl_3$, $AlBr_3$, $SnCl_4$, $BF_3$, $BCl_3$, $SbCl_3$, $ZnCl_2$, hydrogen halides such as hydrogen chloride, alkyl or aryl halides such as dichloroethane, chlorobenzene, $CCl_4$. The amount of halogenating agent used must be such as to convert the organometallic Mg-compound to the dihalide in amounts higher than 10%. The halogenating agent can be reacted with compound $R_mMgX_n$ either after formation of the latter or during formation thereof.

The decomposition product of the Mg compound is preferably reacted with the (HED) compound; the latter, however, can be reacted during the decomposition reaction of the Mg compound. The reaction with the (HED) compound is advantageously conducted in the presence of the (ED) compound. The latter, however, can be reacted either before or after or, as already stated, during the reaction between the Ti compound and product (c).

In a presently preferred embodiment, the complex of this invention is prepared by decomposing the $R_mMgX_n$ compound or complexes thereof with an (ED) compound, to obtain a product consisting of or including a Mg dihalide or complexes thereof with ethers, then reacting said product with the (HED) compound and the (ED) compound, and then with the Ti compound.

The reaction between the Ti compound, preferably $TiCl_4$, and the adduct of the Mg dihalide with at least one (HED) compound may be carried out using the adduct in suspension or in solution in a hydrocarbon diluent.

According to another embodiment of the invention, the adduct which forms between the Mg dihalide and the (HED) compound is decomposed to Mg dihalide prior to the reaction with the Ti compound by means of substances capable of reacting with the (HED) compound and of removing it from the adduct. Such substances are, for example, organometallic compounds, such as $Al(C_2H_5)_3$, $Al(C_2H_5)_2Cl$, halides of Si, Sn, etc.

The halogenated Ti compound is preferably selected from the halides of tetravalent and trivalent Ti, in particular from $TiCl_4$, $TiBr_4$, $TiI_4$, $TiCl_3$, and from the halo-alcoholates of Ti such as, e.g., $Cl_2Ti(O-nC_4H_9)_2$ and $Cl_3TiOCH_3$. Preferably, the Ti compound is liquid under the reaction conditions, and solid Ti compounds, such as $TiCl_3$, are employed in solution in solvents thereof and which generally consist of electron-donor compounds such as, for example, ethers, esters, amines, alcohols. In the latter case the electron-donor compound used to solubilize the Ti compound can be utilized as the (ED) compound.

Electron-donor compound (ED) is preferably selected from the compounds in which the electron-donor group comprises at least one oxygen atom. Examples of presently preferred (ED) compounds are the alkyl and aryl esters of aromatic carboxylic acids, esters of silcic acid, the ethers, the ketones, and the anhydrides of aromatic carboxylic acids. Specific examples include the methyl and ethyl esters of benzoic or p-toluic acid, $Si(OC_2H_5)_4$, di-n-butyl-ether, ethyl-phenyl-ether and benzophenone.

The amount of electron-donor compound employed in the reaction is such that at least 0.5 and up to 4 moles of said compound remain fixed on the catalytic component and are not extractable from the component by treatment thereof with $TiCl_4$ at 80° C. for 2 hours.

The (HED) compound is preferably selected from the aliphatic alcohols containing 2 to 12 C, such as, for example, ethanol, n-butanol, 2-ethyl-hexanol, n-octanol, and substituted phenols which are not substituted in ortho position, such as, for instance, 4-tert.butyl-phenol, p-cresol, beta-naphthol.

The silanols useful to prepare the catalyst component have the formula:

$$R_nSi(OH)_{4-n}$$

wherein R is an alkyl, cycloalkyl or aryl group having 1 to 18 C, and $1 \leq n \leq 3$. Specific examples of these compounds are: trimethylsilanol, triphenylsilanol, diphenyl-disilanol and butyltrisilanol.

Catalysts for the polymerization of olefins are obtained from the catalytic components of this invention by reacting said components with organometallic Al-compounds, for example Al-trialkyls, such as $Al(C_2H_5)_3$, $Al(i-C_4H_9)_3$, Al alkyl halides such as $Al(C_2H_5)_2Cl$, or compounds $R_2Al-O-AlR_2$, or mixtures of such aluminum compounds with organometallic Mg compounds, such as Mg-dialkyls or Mg-alkyl-alkoxy compounds.

The Al/Ti ratio is comprised in a wide range, for example between 1 and 1000.

In the stereoregular polymerization of the alphaolefins $CH_2=CHR$, in which R is an alkyl or aryl radical containing 1 to 8 C, use is preferably made of Al trialkyl compounds, especially when complexed with an electron-donor compound (ED) employed in amounts of from 0.01 to 1 mole per mole of Al alkyl compound.

When the Al/Ti ratio is maintained at values lower than about 30, the Al alkyl compound is not reacted with the electron-donor compound, or the latter is employed in limited amounts, lower than 0.3 moles per mole of Al alkyl compound.

The alpha-olefins are preferably selected from propylene, butene-1 and mixture thereof with ethylene.

When the monomeric material to be polymerized is ethylene or mixtures thereof with alpha-olefins $CH_2=CHR$, in which R is an alkyl radical having 1 to 6 C, Al trialkyl and Al dialkyl-monohalide compounds are utilized.

The polymerization of olefins and of mixtures thereof is carried out according to known methods, by operating in the liquid phase either in the presence or the absence of an inert hydrocarbon solvent, or in the gas phase. The polymerization temperature generally ranges from 50° to 150° C. and the pressure is either atmospheric or higher.

The following examples are given to illustrate the present invention in more detail and are not intended to be limiting.

EXAMPLE 1

300 ml of $SiCl_4$ were introduced, in a nitrogen atmosphere, into a 750 ml flask equipped with a stirrer, a thermometer and a dropping funnel. Successively, 80 ml of a 1.66 M heptane solution of the complex [Mg(n-$C_4H_9$)$_2$]$_3$.Al($C_2H_5$)$_3$ were dropped thereinto.

At the conclusion of such addition the temperature was brought to 50° C., and the reaction was continued for 4 hours. The solid was separated by filtration and washed with n-heptane at 50° C., then it was suspended again in a heptane solution containing 0.0265 moles of ethyl benzoate and 0.12 moles of ethanol, and allowed to react for 2 hours at 60° C. After filtering and 3 washings with 200 ml portions of n-heptane, the solid was suspended in 200 ml of TiCl$_4$, heated at 100° C. for 2 hours, after which the TiCl$_4$ was removed by filtration and an equal amount thereof was added. After two hours, the mass was filtered and washed with n-heptane at 90° C. until disappearance of the chlorine ions from the filtrate. On analysis the dried solid had the following composition by weight:

Ti=2.1%;
Cl=59.5%.

The data relating to the propylene polymerization test carried out using, as solid catalytic component, the compound described in this Example are recorded in Table I.

The polymerization of propylene was conducted under the conditions specified below:

5 millimoles of a mixture of aluminum trialkyls having the following composition of the gases (percent by vol.) after hydrolysis:

ethane=9.
isobutane=49.4
n-butane=41.2
propane=0.16
isobutane=0.24 were reacted at room temperature with 1.25 millimols of methyl para-toluate in 80 ml of anhydrous, desulphurated n-heptane for 5 minutes.

50 ml of such solution were contacted with a suitable amount of the catalyst component indicated in Table I. The remaining 30 ml were diluted to 1000 ml with n-heptane and introduced, under a nitrogen pressure, into a steel autoclave having a capacity of 3000 ml, equipped with a magnetic anchor stirrer and a thermometer, and thermoregulated at 50° C., into which propylene was made to flow. In the same manner the catalytic component suspension was then introduced into the autoclave. After closing the autoclave, hydrogen was added up to a partial pressure of 0.3 atm., whereupon it was heated to 70° C. under simultaneous feeding of propylene until a total pressure of 7 atm was reached. Such pressure was kept constant all through the polymerization, feeding of the monomer being continued. Polymerization was stopped after 4 hours and the polypropylene was isolated by treatment with methanol and acetone.

The results of the polymerization tests conducted under the above-mentioned conditions and using the catalyst components described in the Examples are recorded in Table I.

EXAMPLE 2

Example 1 was repeated, but using [Mg(n-C$_4$H$_9$)$_2$]$_2$.Al(i-C$_4$H$_9$)$_3$ in a 1.33M heptane solution.

The analytical data for the solid catalytic component are: Ti=1.8%; Cl=58.6%; and the data relating to the polymerization of propylene carried out under the conditions of Example 1 are recorded in Table I.

EXAMPLE 3

Example 1 was repeated but using a 0.66M solution of [Mg(n-C$_4$H$_9$)$_2$]$_2$.Al(i-C$_4$H$_9$)$_3$.

The analytical data for the solid catalytic component are as follows: Ti=2.1%; Cl=60.2%; the data concerning the polymerization of propylene carried out under the conditions of Example 1 are recorded in Table I.

EXAMPLE 4

Operation was as described in Example 1, but using a 0.3M solution of [Mg(n-C$_4$H$_9$)$_2$]$_2$.Al(i-C$_4$H$_9$)$_2$(O-n-C$_4$H$_9$).

The analytical data for the solid catalytic component are as follows: Ti=2.3%; Cl=58.0%; the data referring to the propylene polymerization effected under the conditions of Example 1 are recorded in Table I.

EXAMPLE 5

500 ml of SiCl$_4$ were introduced, in a nitrogen atmosphere, into a 750 ml flask equipped with a stirrer, a thermometer and a dropping funnel; 200 ml of a 0.53M heptane solution of [Mg(n-C$_4$H$_9$)$_2$]$_2$.2Al(i-C$_4$H$_9$)$_3$ were then dropped in. At the conclusion of such addition the temperature was brought to 50° C. and the whole was allowed to react for 4 hours.

The solid was separated by filtration after 4 washings with 200 ml portions of n-heptane at 50° C., whereupon it was suspended in 42.4 ml of an 0.5M ethyl benzoate solution in n-heptane and allowed to react for 2 hours at 60° C.

After filtration, the solid was mixed with 53 ml of a 1M heptane solution of n-C$_4$H$_9$OH and reacted at 60° C. for 2 hours. After 3 washings with 200 ml portions of n-heptane at the same temperature, the solid was suspended in 200 ml of TiCl$_4$ and heated to 100° C. for 2 hours. The TiCl$_4$ was removed by filtration and an equal amount thereof was added again. After 2 hours, the mass was filtered and washed with n-heptane at 90° C. until chlorine ions disappeared from the filtrate.

The solid so obtained, after drying under vacuum, was subjected to analysis, revealing the following composition by weight: Ti=1.8%; Cl=58.2%.

The data relating to the propylene polymerization test carried out under the conditions of Example 1 are recorded in Table I.

TABLE I

| | POLYMERIZATION OF PROPYLENE | | | |
|---|---|---|---|---|
| Example No. | Catalyst component g | Yield kg PP/g Ti | η inh (dl/g) | Isotacticity index % |
| 1 | 0.070 | 220 | 1.79 | 92. |
| 2 | 0.068 | 209 | 1.6 | 92.5 |
| 3 | 0.068 | 210 | 1.44 | 90.5 |
| 4 | 0.071 | 220 | 1.76 | 93.2 |
| 5 | 0.070 | 230 | 1.6 | 91. |

EXAMPLE 6

300 ml of a 4M SiCl$_4$ solution in iso-octane were introduced, in a nitrogen atmosphere, into a 750 ml flask equipped with a stirrer, a thermometer and a dropping funnel. 136 ml of a 0.885M iso-octane solution of complex (C$_4$H$_9$)MgCl..2.29(C$_4$H$_9$)$_2$O were then dropped into the flask. The temperature was maintained at 15° C. for 30 minutes and then at 30° C. for 3 hours. The solid product was separated by filtration and washed with n-heptane at room temperature.

That resulting solid was suspended in 500 ml of n-heptane containing ethyl benzoate and ethanol in amounts respectively of 0.2 mole and 1.4 moles per gram atom of Mg. The mass was reacted at 60° C. for 1 hour. TiCl$_4$ was then added in an amount corresponding to a ratio g-atom Mg/TiCl$_4$=1/20 and the mass was heated to 110° C. for 2 hours.

Successively, the liquid phase was separated by filtration at 120° C. and fresh TiCl$_4$ was added in the amount indicated hereinabove in respect of Mg. The whole was kept at 120° C. for 2 hours, whereupon it was filtered at 100° C. and washed with n-heptane until the disappearance of the chlorine ions. On analysis, the dried solid had the following composition by weight: Ti=2.9%; Cl=63%.

The final dry solid was used as a catalyst component in the polymerization of propylene carried out under the following conditions.

5.05 m.moles of a mixture of Al-butyls [54.4% by moles of Al-(i-butyl)$_3$, the remainder being Al-(n-butyl)$_3$] were reacted, at room temperature, with 1.69 m.moles of methyl-p-toluate in 80 ml of anhydrous n-heptane for 5 minutes.

30 ml of said solution, diluted with 50 ml of anhydrous n-hexane, were contacted with 53 mg of the solid catalyst component. The resulting suspension was introduced, in a nitrogen atmosphere, into a stainless steel autoclave having a capacity of 2.5 l, equipped with a magnetic stirrer and a thermocouple and containing 870 ml of n-hexane saturated with propylene at 40° C. Successively, in a propylene stream, the remaining 50 ml of solution containing Al-butyl and methyl-p-toluate were introduced.

Example 6. The polymer yield was of 290 kg/g of Ti; the isotacticity index was equal to 90.5.

EXAMPLE 8

Example 6 was repeated with the exception that a 3.1M solution of (C$_2$H$_5$)MgCl in ethyl ether was dropped into 300 ml of a 4M solution of SiCl$_4$ in n-hexane, the temperature being kept at 25° C. for 3 hours. 75 mg of the dried solid obtained from the reaction with TiCl$_4$ and containing, on analysis, 2.7% of Ti and 64% of Cl, were employed in the polymerization of propylene under the conditions of Example 6.

456 g of polymer were obtained, in a yield of 225 kg/g of Ti and having an isotactic index of 91.5.

EXAMPLE 9

11.44 g of Mg(OC$_2$H$_5$)$_2$ and 136 ml of SiCl$_4$ were charged into a flask. The suspension, under stirring, was brought to 60° C. and maintained at such temperature for 21 hours.

The solid product which formed was then separated by filtration, washed with n-heptane at room temperature and suspended in 500 ml of n-heptane containing ethyl benzoate and ethanol in amounts equal respectively to 0.2 mole and 2 moles per gram atom of Mg. The mass was reacted at 60° C. for 1 hour.

TABLE II

| Example No. | Mg compound | Halogenating agent type | ml | HED compound | ED compound | Yield Kg/g Ti | Isotacticity index |
|---|---|---|---|---|---|---|---|
| 10 | Mg(OC$_2$H$_5$)$_2$ | SnCl$_4$ | 208 | C$_2$H$_5$OH | C$_6$H$_5$COOC$_2$H$_5$ | 250 | 90.5 |
| 11 | Mg(O—n-C$_4$H$_9$)$_2$ | SiCl$_4$ | 136 | C$_2$H$_5$OH | C$_6$H$_5$COOC$_2$H$_5$ | 320 | 91. |
| 12 | Mg(O—n-C$_4$H$_9$)$_2$ | SiCl$_4$ | 136 | C$_2$H$_5$OH | C$_6$H$_5$COCl | 340 | 92.5 |
| 13 | Mg(OC$_2$H$_5$)$_2$ | SiCl$_4$ | 136 | (CH$_3$)$_3$SiOH | C$_6$H$_5$COOC$_2$H$_5$ | 250 | 90. |
| 14 | Mg(OC$_2$H$_5$)$_2$ | SOCl$_2$ | 119 | C$_2$H$_5$OH | C$_6$H$_5$COOC$_2$H$_5$ | 247 | 89.5 |
| 15 | ClMgOC$_2$H$_5$ | SiCl$_4$ | 136 | C$_2$H$_5$OH | C$_6$H$_5$COOC$_2$H$_5$ | 345 | 92. |
| 16 | nC$_3$H$_7$MgOnC$_3$H$_7$ | SiCl$_4$ | 136 | C$_2$H$_5$OH | C$_6$H$_5$COOC$_2$H$_5$ | 305 | 90.5 |

After closing the autoclave, 300N cc of hydrogen were introduced, the temperature was brought to 60° C. and propylene was simultaneously introduced until a pressure of 9 atm. was reached. During the polymerization the pressure was kept constant by feeding propylene.

After 4 hours, the polymerization was stopped, the polymer was separated from the solvent by stripping with steam and was dried at 70° C. in a nitrogen stream. 432 g of polymer were obtained, corresponding to a yield of 281 kg/g of Ti. The isotactic index, determined by extraction of the polymerization product in boiling n-heptane for 3 hours, was 89.5.

EXAMPLE 7

Example 6 was repeated, with the exception that 77 ml of a 1.39M solution of the complex (n-C$_4$H$_9$)MgCl.2.29(n-C$_4$H$_9$)$_2$O in toluene were dropped into 300 ml of a 1.43M solution of Al(C$_2$H$_5$)Cl$_2$ in n-hexane. The temperature was maintained at 25° C. for 3 hours.

The solid thus formed was separated by filtration and washed with n-heptane at 50° C., then suspended in 500 ml of n-heptane containing ethyl benzoate and ethanol in amounts respectively equal to 0.2 mole and 3 moles per gram atom of Mg. The reaction with TiCl$_4$ was effected under the conditions of Example 6.

The dried solid, subjected to analysis, gave the following result Ti=2.5%; Cl=64%.

51 mg of the solid catalyst component were used in the polymerization of propylene under the conditions of The solid reaction product was separated by filtration and successively treated for 2 hours with 200 ml of TiCl$_4$ at 135° C. That mass was hot filtered, and 200 ml of TiCl$_4$ were added to the solid, the mix being kept at 135° C. for 2 hours, hot-filtered and washed with n-heptane until the disappearance of chlorine ions.

A portion of the dried solid was subjected to analysis, with the following results: Ti=2.6% by weight; Cl=64% by weight.

The final dried solid was used as catalytic component in the polymerization of propylene conducted under the conditions of Example 6. The polymer yield was 320 kg/g of Ti; the isotactic index was equal to 92.

EXAMPLES 10–16

Example 9 was repeated, but using the reagents indicated in Table II, which also records the results obtained from the polymerization of propylene.

EXAMPLE 17

14.3 mg of the catalyst component prepared as in Example 6, in suspension in 1000 ml of hexane containing 2 g of Al triisobutyl, were introduced into the autoclave of said Example, such operation being carried out in a slight ethylene flow.

The temperature was rapidly brought to 85° C., while simultaneously introducing hydrogen up to a pressure of 7.4 atm. and then ethylene up to a pressure of 15 atm. The polymerization was continued for 4 hours under continuous introduction of ethylene to maintain a constant pressure of 15 atm. At the conclusion, 290 g of polymer with a yield of 699 kg per g of Ti were obtained.

What is claimed is:

1. Process for preparing components of catalysts for the polymerization of olefins which comprises mixing the solid product of the reaction of:
    (a) a halogenated Ti-compound containing at least a Ti-halogen bond, and
    (b) an electron-donor compound which does not contain active hydrogen atoms (ED) reacted as such or as a complex with product (c) prepared without cogrinding of the product (c) with compound (ED), and employed in such amount and under such conditions, that from 0.2 to 4 moles of compound (ED) per gram atom of Ti of compound (a) are present in the catalyst component;
with
    (c) the solid product prepared without cogrinding, of the reaction between at least one electron-donor compound containing active hydrogen atoms (HED), selected from among the group consisting of aliphatic, cycloaliphatic and aromatic alcohols and thioalcohols having 1 to 20 C, phenols and thiophenols having 6 to 20 C and silanols having 1 to 20 C, and a Mg dihalide, or a complex of said Mg dihalide with a compound (ED), obtained by reaction of halogenating agents other than the Ti compounds of (a), with an organic Mg compound of formula:

$$R_m MgX_n$$

in which R is an alkyl, alkenyl, cycloalkyl or aryl radical containing 1 to 20 C, or a group OR, X is a halogen or a radical R, OR or COX' in which R has the meaning stated, X' is halogen, $0 < m \leq 2$, $0 \leq n < 2$, and $n+m$ is 2, product (c) being reacted as such, without any intermediate pretreatment with an Al-alkyl compound.

2. The process of claim 1, in which compound (a) is a Ti tetrahalide, (b) compound (ED) is an alkyl, aryl or cycloalkyl ester of benzoic acid or of derivatives thereof, and (c) is the product of the reaction of 0.1 mole to 6 moles of an aliphatic alcohol or of a phenol with 1 mole of Mg dichloride or Mg dibromide, or a complex thereof with ethers, obtained through decomposition with halogenating agents selected from the group consisting of halogenated compounds of Si, SOCl$_2$, an Al alkyl halide and SnCl$_4$, of mono- and dialkyl Mg compounds, or complexes thereof with ethers, or of Mg mono- and dialcoholates.

3. Catalysts for polymerizing olefins, prepared by mixing catalyst components obtained by the process of claim 1, with organometallic aluminum compounds.

4. Catalysts according to claim 3, in which the organometallic Al compound is an Al trialkyl.

5. Catalysts according to claim 4, in which the aluminum trialkyl compound is complexed with from 0.1 mole to 1 mole of electron-donor compound (ED).

* * * * *